United States Patent [19]

Blanpain et al.

[11] Patent Number: 4,885,536

[45] Date of Patent: Dec. 5, 1989

[54] MAGNETIC PROCESS FOR DETERMINING A TRAJECTORY FOR FINDING A MAGNETIC OBJECT AND APPARATUS FOR PERFORMING THE PROCESS

[75] Inventors: Roland Blanpain, St Laurent du Pont; Patrick Le Masson, Villard de Lans; Jean-Charles Vidal, Meylan, all of France

[73] Assignee: Commissariat a l'Energie Atomique, Paris, France

[21] Appl. No.: 147,139

[22] Filed: Jan. 22, 1988

[30] Foreign Application Priority Data

Jan. 30, 1987 [FR] France ................. 87 01129

[51] Int. Cl.[4] ............... G01B 7/14; G01R 33/02
[52] U.S. Cl. ............... 324/207; 324/247; 364/462
[58] Field of Search ............... 324/207, 208, 247; 342/450, 457, 459; 364/443, 444, 449, 460, 462

[56] References Cited

U.S. PATENT DOCUMENTS

| | | | |
|---|---|---|---|
| 4,396,885 | 8/1983 | Constant | 324/208 |
| 4,427,943 | 11/1984 | Cloutier et al. | 324/326 |
| 4,438,401 | 3/1984 | Iwamoto et al. | 324/247 |
| 4,489,274 | 12/1984 | Berlincourt | 324/248 |
| 4,492,923 | 1/1989 | Byram | 324/207 |
| 4,600,883 | 7/1986 | Egli et al. | 324/207 |

FOREIGN PATENT DOCUMENTS

| | | |
|---|---|---|
| 0057341 | 11/1982 | European Pat. Off. |
| 2142181 | 1/1973 | France |
| 2080576 | 7/1980 | United Kingdom |
| 2171523 | 8/1986 | United Kingdom |

Primary Examiner—Gerard R. Strecker
Assistant Examiner—Walter E. Snow
Attorney, Agent, or Firm—Ladas & Parry

[57] ABSTRACT

Magnetic process for determining the trajectory of a moving vehicle for finding a fixed or moving magnetic object and apparatus for performing the process.

The apparatus comprises magnetometers for measuring at least p independent components of the gradient of the local magnetic field, in which p is an integer equal to the number of dimensions of the space in which the moving vehicle is displaced, a circuit for storing a scalar criterion which is a function of at least one of the components of the measured gradient, a circuit for calculating the direction ($\theta$, $\psi$) maximizing the criterion as a function of the measured gradient and a display, for use in guiding the vehicle.

3 Claims, 2 Drawing Sheets

MAGNETIC PROCESS FOR DETERMINING A TRAJECTORY FOR FINDING A MAGNETIC OBJECT AND APPARATUS FOR PERFORMING THE PROCESS

BACKGROUND OF THE INVENTION

The present invention relates to a magnetic process for determining a trajectory for finding or reaching a moving or fixed magnetic object. This process can consist of guiding a moving vehicle or contrivance to a magnetic object. The invention also relates to an apparatus for performing the process.

The problem of guiding a moving vehicle in space occurs frequently in the most varied fields, particularly in robotics or for seeking objects or persons (e.g., skiers lost in an avalanche).

The known processes for guiding a moving vehicle to a fixed or moving object usually use wave techniques of the radar or infrared type. All these processes are based on the location of the object in a moving reference frame linked with the vehicle.

The invention applies to the guidance of a moving vehicle to a magnetic object. The magnetic object can be naturally magnetic, e.g. if it has ferromagnetic materials. It can also be made magnetic by adding ferromagnetic elements to it, or by giving it a magnetic field source, e.g. with the aid of a coil through which passes a direct or alternating current. In the later case, the object to which it is wished to guide the moving vehicle or contrivance is then equivalent to a magnetic multipole. A known magnetic guidance process based on the location of an object in a moving reference frame linked with the vehicle, like the known wave processes referred to hereinbefore, suffers from disadvantages.

That is, the process requires the modelling of the magnetic field and the solution of the reverse problem caused by location on the basis of the measurements performed. However, this modelling presents difficulties, because the analytical model defining the magnetic field produced by the object evolves in time as the vehicle moves towards the object. In particular, certain multipolar terms in the expression of the magnetic field produced by the magnetic multipole (i.e. the object) are negligible with respect to the accuracy of the measurements performed by the vehicle when the latter is at a great distance from the object, whereas this no longer applies when the vehicle approaches the object.

Furthermore, a magnetic process based on the location of the object is also made difficult because it has to take account of the earth's magnetic field or the geomagnetic field.

SUMMARY OF THE INVENTION

The invention aims at avoiding the location of the object so as not to have to use a time-evolving analytical model of the magnetic field produced by the object.

This objective is achieved by a guidance method consisting of calculating a privileged direction of the displacement of the vehicle on the basis of the magnetic field measurements obtained by the vehicle measuring means without it being necessary to solve the reverse problem, i.e. locating the object as a function of the measured magnetic field, or modelling the magnetic source constituted by the object.

The invention also aims at minimizing the influence of the geomagnetic field on the measurements obtained. Therefore, for calculating the preferred or privileged vehicle displacement direction, it makes use of measurements of the derivative or "gradient" of the magnetic field.

More specifically, the invention relates to a magnetic process for determining a trajectory for moving a vehicle for finding a fixed or moving magnetic object, said process consisting of the following stages:

at least p components independent of the gradient of the magnetic field are measured in the vicinity of the moving vehicle, in which p is an integer equal to the number of dimensions of the space in which the moving vehicle moves, use is made of a scalar criterion, which is a function of said measured components of the magnetic field gradient in order to determine the direction in which the magnetic object is located with respect to the moving vehicle, the direction being that for which the said criterion is at a maximum, the moving vehicle is moved in a displacement direction taking account of said direction determined by the maximum of said criterion and said stages are repeated until the moving vehicle reaches the magnetic object.

The direction determined by the maximum of the criterion is that in which the magnetic object is located at the time of measuring the components of the magnetic field gradient.

In the case where the magnetic object is fixed, the moving vehicle or contrivance finds or reaches the magnetic object by moving in said determined direction. In general terms, when the magnetic object is mobile, the moving vehicle can be displaced with or without taking account of the movement of the magnetic object. In the first case, the displacement direction of the moving vehicle is identical to that of the direction determined by the maximum of the criterion. This method is called simple navigation. In the second case, the displacement direction of the moving vehicle is calculated as a function of the direction determined by the maximum of the criterion, but also takes account of the displacement of the magnetic object. This method is called proportional navigation.

The term magnetic field is here used to mean a random variable at least partly representing said magnetic field, such as e.g. the modulus of the magnetic field or the magnetic field vector.

According to a preferred first variant components of the gradient of the module of the magnetic field vector are measured. In this case, the criterion can advantageously be the modulus of the measured gradient vector. The displacement of the moving vehicle then takes place in the direction of the measured gradient vector. In this variant, the gradient vector direction corresponds to the sought displacement direction and there is no need to expressly calculate the criterion maximum.

According to a second preferred variant, the gradient tensor of the magnetic field vector is measured. The criterion can then advantageously be the modulus of the gradient vector of one of the components of the magnetic field vector, i.e. the modulus of the vector equal to one of the columns of the tensor.

The first preferred variant makes it possible to partly overcome the geomagnetic field, whilst the second makes it possible to almost completely overcome it.

In preferred manner, the magnetic object is provided with a periodic electromagnetic source and the measurement of the magnetic field gradient is synchronous.

This makes it possible to completely overcome the influence of the geomagnetic field.

The invention also relates to an apparatus for performing the process. This apparatus comprises a means for measuring at least p components dependent of the local magnetic field gradient, in which p is an integer equal to the number of dimensions in the space in which the moving vehicle moves, a means for storing a scalar criterion which is a function of at least p said components of the measured gradient, a means for calculating the direction maximizing said criterion as a function of the measured gradient and a display means for said values.

According to a first preferred embodiment, the measuring means is a triaxial gradient meter constituted by four total magnetic field magnetometers located at the apex and on each of the axes of a trihedron.

According to a second preferred embodiment, the measuring means comprises three pairs of total magnetic field magnetometers, each pair of magnetometers being located on one axis of a tri-hedron and the two magnetometers of the same pair are positioned symmetrically with respect to the origin of said trihedron.

According to a third advantageous embodiment, the measuring means comprises a plurality of pairs of directional magnetometers, each pair being located on one axis of a trihedron, each directional magnetometer measuring one component of the magnetic field in accordance with one of the three axes of the trihedron.

In each of the three aforementioned embodiments, the trihedron defining the position of the magnetometers may, but need not necessarily be a trirectangle.

BRIEF DESCRIPTION OF THE DRAWINGS

The features and advantages of the invention can be better gathered from the following non-limitative, illustrative description with reference to the attached drawings, wherein show.

DESCRIPTION OF THE PREFERRED EMBODIMENTS OF THE INVENTION

Figure 1:
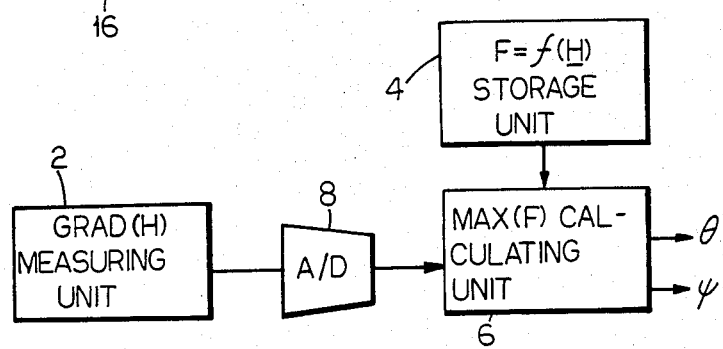
FIG. 1 a diagrammatic drawing of the apparatus for seeking a magnetic object according to the invention.

FIG. 1. diagrammatically shows an apparatus for seeking a magnetic object according to the invention. This apparatus has a measuring unit 2 for measuring at least p components of the gradient of the magnetic field H in the vicinity of the apparatus, in which p is the number of dimensions of the space in which the seeking apparatus moves. A storage unit stores a predetermined criterion, which is a scalar function dependent on at least three of the measured components of the magnetic field gradient. A calculating means unit 6 determines, as a function of the magnetic field in the vicinity of the apparatus, the direction in the space corresponding to the maximum of said criterion. An analog-digital (AIO) converter 8. which is optional, is positioned between the measuring means 2 and the calculating means 6. The measuring means can e.g. be designed for measuring the gradient of the modulus of the magnetic field. In this case, the gradient is a vector and the measuring means 2 can be constituted by total field magnetometers, such as nuclear magnetic resonance (NMR) magnetometers, or electronic paramagnetic resonance (EPR) magnetometers, each of which measure the magnetic field modulus. Each component of the gradient is then obtained by the differentiation of two measurements of the modulus at two different points.

The measuring means can also be designed for measuring the gradient of the magnetic field vector. In this case, the gradient is a tensor and the measuring means 2 can be constituted by fluxgate directional magnetometers, thin film magnetometers or coils, each of which measure one component of the magnetic field vector. Each component of the tensor is then deduced from the differential measurements between two measurements on the same axis.

In all cases, the magnetometers constituting the measuring means make it possible to determine the modulus of the magnetic field or a component of the magnetic field vector and a component of the gradient is obtained by the difference between two measurements. These measurements can be performed by independent magnetometers. However, the component of the gradient can also be directly obtained by a pair of magnetometers connected as crossed oscillators and thus constituting a gradient meter, such as that described e.g. in No. FR-A-2 583 885.

Special embodiments of the measuring means 2 will be described relative to FIGS. 3 to 6.

Hereinafter consideration will be given in exemplified manner to the seeking apparatus moving in a space with p=3 dimensions.

The criterion chosen for determining the direction in which the magnetic object is located with respect to the apparatus is a predetermined scalar function, which takes account of at least three (p in the general case) measured components of the magnetic field gradient. Different functions can be used as a criterion. The criterion retained is dependent on the measuring means 2 used, because the criterion can only take account of components of the gradient of the magnetic field which are known.

Knowing the characteristics of the magnetic field at an instant $T_n$ in the vicinity of the apparatus, via measuring means 2, calculating means 6 can determine the direction of the space for which the criterion is at a maximum at said instant $T_n$. This calculation is based on very conventional function optimization mathematical methods. The result of this calculation can be communicated in the form of two angles $\theta, \psi$ designating the direction maximizing the criterion in spherical co-ordinates with respect to a trihedron (or more generally a reference frame with p independent directions) linked with the seeking apparatus.

When the calculating means 6 supplies the values $\theta$ and $\psi$ indicating the direction in space of the sought object, the apparatus is displaced, or is automatically displaced if it is associated with propulsion means, in the said direction in the case of simple navigation or in a direction linked therewith in the case of proportional navigation.

The magnetic field is regularly measured at successive instants $T_n$, $T_{n+1}$, $T_{n+2}$ ... and the displacement direction is modified at each of said instants as a function of the measured magnetic field.

In applications such as the rapid search for persons buried under the snow, the seeking apparatus according to the invention makes it possible to find such a person, provided that he has a magnetic dipole. In such an application, the locating apparatus can be in the form of a portable apparatus. The values of the angles $\theta$ and $\psi$ indicating the direction in which it is necessary to move in order to find the sought person are then e.g. displayed on a display screen and the apparatus is moved in the indicated direction by the rescuers.

In other applications, the seeking apparatus can form part of a self-propelled vehicle. In this case, the values of these angles $\theta$ and $\psi$ are transmitted in electric signal form to means for controlling the vehicle propulsion means.

Figure 2:
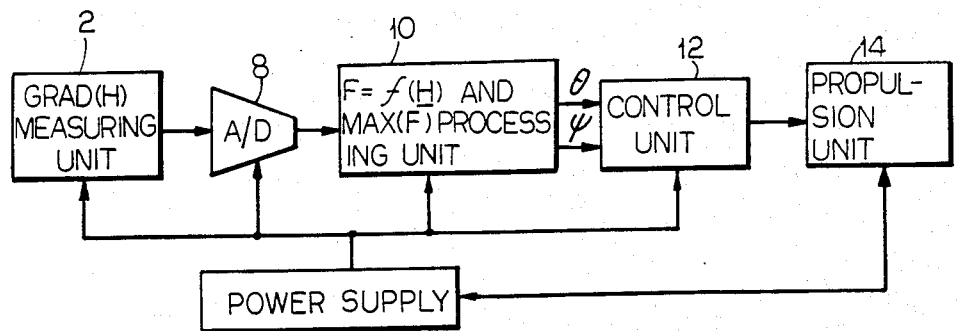
FIG. 2 a diagrammatic drawing of an automotive moving vehicle or contrivance having a seeking apparatus according to the invention.

Such a moving vehicle is diagrammatically shown in FIG. 2 essentially comprises a guidance apparatus according to the invention and propulsion means.

More specifically, the vehicle shown in FIG. 2 comprises a measuring means 2 for measuring at least three (p in the general case) components of the gradient of the magnetic field in the vicinity of the vehicle, an analog-digital converter 8 for converting the analog signals supplied by the measuring means 2 into digital signals, and a processing unit 10 corresponding to means 4 and 6 of the apparatus of FIG. 1. The means 2,8 and 10 constitute the seeking apparatus.

The moving vehicle also comprises a displacement control unit 12 receiving from processing means 10 the values of the angles $\theta$ and $\psi$ indicating the direction maximizing the criterion (and in which the vehicle must move in the case of simple navigation), said direction being defined in a trihedron linked with the vehicle. Control unit 12 supplies a control signal to a propulsion means 14 in order to place the vehicle on the desired trajectory.

Means 2,8,10 and 12 and optionally 14 of the vehicle are energized by an electric power supply 16, which can receive its energy from propulsion means 14. The seeking apparatus of FIG. 1, or the moving vehicle of fig. 2, can be displaced or displace itself by any known guidance means and in particular simple or proportional navigation methods.

The magnetic field in the vicinity of the apparatus results from the superimposing of the magnetic field Hc created by the magnetic object to be located, the geomagnetic field Ho and a magnetic field Hb corresponding to disturbances, e.g. produced by magnetic elements of the seeking apparatus. Thus, the total magnetic field H is equal to Ho +Hc +Hb. In this expression and hereinafter, the vector quantities are indicated by underlining.

A description will now be given of several embodiments of measuring means 2.

According to a first embodiment, measuring means 2 is constituted by total field magnetometers, each measuring the modulus of the magnetic field in which they are placed. Preferably the number and position of the magnetometers are chosen so as to have information on the components of the gradient of the magnetic field modulus in three independent and e.g. orthogonal directions.

Figure 3:
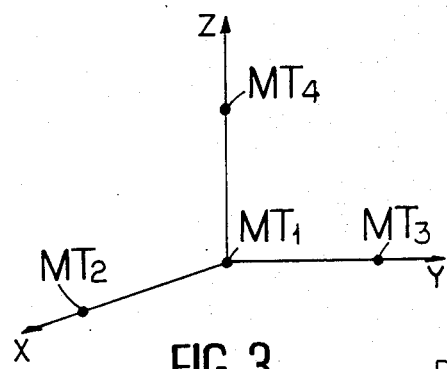
FIG. 3 diagrammatically a first embodiment of the magnetic field measuring means of the apparatus according to the invention.

A first embodiment of the measuring means using four total field magnetometers MT1, MT2, MT3 and MT4 is shown in FIG. 3, where the position of each magnetometer is indicated in an orthogonal reference frame (Ox, Oy, Oz) centred on the seeking apparatus.

Magnetometer MT1 is placed in the centre of the reference frame (Ox, Oy, Oz) and magnetometers MT2, MT3 and MT4 are respectively placed on the axes Ox, Oy and Oz of the reference frame. These total field magnetometers only make it possible to measure the modulus S and not the magnetic field H. The modulus is defined by $S = H^T \cdot H$, in which $H^T$ represents the transposed vector of vector H. The four total field magnetometers forming the measuring means make it possible to calculate the gradient of the modulus S of the magnetic field H in the vicinity of the apparatus. This gradient is defined by:

$$\mathrm{grad}(S) = \begin{bmatrix} \frac{\partial S}{\partial x} \\ \frac{\partial S}{\partial y} \\ \frac{\partial S}{\partial z} \end{bmatrix}$$

The vector $\begin{bmatrix} S_2 - S_1 \\ S_3 - S_1 \\ S_4 - S_1 \end{bmatrix}$ in which $S_1$, $S_2$, $S_3$ and $S_4$ are values of the modulus S of the magnetic field H respectively measured by magnetometers MT1, MT2, MT3 and MT4, constitutes a biased estimate of said gradient at point 0.

The displacement of the apparatus towards the sought magnetic object takes place in a direction defined on the basis of a criterion dependent on the three components of said gradient.

In the case of a measuring means having total field magnetometers, as shown in FIG. 3, criterion F can be simply equal to the square of the modulus of the gradient, i.e. to $\mathrm{grad}(S)^T \cdot \mathrm{grad}(S)$.

The displacement direction of the apparatus corresponds to the direction maximizing this criterion.

Figure 4:
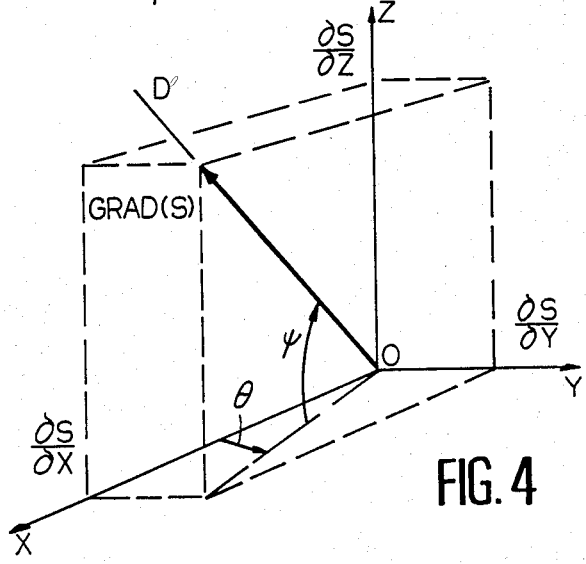
FIG. 4 a graph showing the direction D in which the criterion is at a maximum for an apparatus, whereof the measuring means corresponds to FIG. 3.

In the case of the chosen criterion, said direction D is simply the direction of the vector $\mathrm{grad}(S)$. Thus, there is no need to seek the maximum of criterion F. As shown in FIG. 4, the direction D corresponding to the maximum of the criterion can be defined with respect to the reference frame (Ox, Oy, Oz) by the angles $\theta$ and $\psi$, which are calculated on the basis of measured components of the gradient of modulus S:

$$\text{and setting } R = \sqrt{\left(\frac{\partial S}{\partial x}\right)^2 + \left(\frac{\partial S}{\partial y}\right)^2 + \left(\frac{\partial S}{\partial z}\right)^2} =$$

$$\sqrt{(S_2 - S_1)^2 + (S_3 - S_1)^2 + (S_4 - S_1)^2}$$

$$\text{we obtain } \psi = \mathrm{Arcsin}\left(\frac{\frac{\partial S}{\partial z}}{R}\right) = \mathrm{Arcsin}\left(\frac{S_4 - S_1}{R}\right)$$

-continued $$\text{and } \theta = \text{Arctg}\left(\frac{\frac{\partial S}{\partial y}}{R}\right) + \delta_x \cdot \pi = \text{Arctg}\left(\frac{S_3 - S_1}{R}\right) + \delta_x \cdot \pi$$

in which $\delta_x = 0$ if $\frac{\partial S}{\partial x} \geq 0$ and $\delta_x = 1$ if $\frac{\partial S}{\partial x} < 0$ with $\psi \in \left[-\frac{\pi}{2}, \frac{\pi}{2}\right]$ and $\theta \in [0, 2\pi]$.

Figure 5:
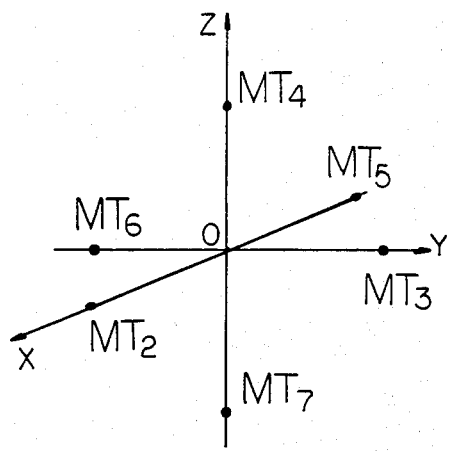
FIG. 5 a constructional variant of the measuring means of FIG. 3.

With the measuring means diagrammatically shown in FIG. 5 the determination of direction D is biased, because the measured gradient is not completely independent of the geomagnetic field Ho.

It is possible to overcome the geomagnetic field and its variations, when the sought object is a source of a periodic magnetic field. For this, the magnetic field detection for estimating the values of the gradients of its components is synchronized with the period of the periodic magnetic field of the source object.

FIG. 5 diagrammatically shows a constructural variant of the measuring means for measuring the gradient of the total magnetic field modulus. In this variant, the measuring means is constituted by six total field magnetometers MT2, MT3, ..., MT7, which are in pairs. The two magnetometers of each pair are those located on the same axis of a reference frame (Ox, Oy, Oz) symmetrically with respect to the centre of said frame.

Each magnetometer measures the modulus S of the magnetic field. The measured values of the components of the gradient of the modulus grad(S) are then:

$$\begin{bmatrix} S_2 - S_5 \\ S_3 - S_6 \\ S_4 - S_7 \end{bmatrix}$$

in which $S_2, S_3, \ldots S_7$ are the moduli respectively measured by the magnetometers MT2, MT3, ..., MT7. This constitutes an unbiased gradient estimate at point O.

The criterion used for defining the direction of the displacement of the apparatus towards the sought object can be the same as in the apparatus having the measuring means of FIG. 3. The angles $\theta$ and $\psi$ defining this direction in the reference frame (Ox, Oy, Oz) are then defined by the equations:

$$R = \sqrt{\left(\frac{\partial S}{\partial x}\right)^2 + \left(\frac{\partial S}{\partial y}\right)^2 + \left(\frac{\partial S}{\partial z}\right)^2} = \sqrt{(S_2 - S_5)^2 + (S_3 - S_6)^2 + (S_4 - S_7)^2}$$

$$\text{we obtain } \psi = \text{Arcsin}\left(\frac{\frac{\partial S}{\partial z}}{R}\right) = \text{Arcsin}\left(\frac{S_4 - S_7}{R}\right)$$

$$\text{and } \theta = \text{Arctg}\left(\frac{\frac{\partial S}{\partial y}}{R}\right) + \delta_x \cdot \pi = \text{Arctg}\left(\frac{S_3 - S_6}{R}\right) + \delta_x \cdot \pi$$

in which $\delta_x = 0$ if $\frac{\partial S}{\partial x} \geq 0$ and $\delta_x = 1$ if $\frac{\partial S}{\partial x} < 0$ with $\psi = \left[-\frac{\pi}{2}, \frac{\pi}{2}\right]$ and $\theta \in [0, 2\pi]$.

The measuring means described relative to FIGS. 3 and 5 comprise total field magnetometers, i.e. magnetometers measuring the modulus of the magnetic field present at the measuring point. Such a measuring means only permits access to the gradient of the magnetic field modulus.

The most complete knowledge of the magnetic field is obtained when each of the three components Hx, Hy and Hz of the magnetic field H is measured in accordance with each of the three directions Ox, Oy and Oz.

These nine parameters constitute a tensor representing the gradient tensor of the magnetic field grad(H). This gradient is equal to:

$$\begin{bmatrix} \frac{\partial Hx}{\partial x} & \frac{\partial Hx}{\partial y} & \frac{\partial Hx}{\partial z} \\ \frac{\partial Hy}{\partial x} & \frac{\partial Hy}{\partial y} & \frac{\partial Hy}{\partial z} \\ \frac{\partial Hz}{\partial x} & \frac{\partial Hz}{\partial y} & \frac{\partial Hz}{\partial z} \end{bmatrix}$$

The complete knowledge of the magnetic field consequently presupposes the knowledge of nine parameters. However, by taking account of the properties of the magnetic field H at the measuring point, the tensor can be defined by only five parameters.

A first property of the magnetic field H is that its curl is zero, which is translated by the relations:

$$\frac{\partial Hx}{\partial y} = \frac{\partial Hy}{\partial x} \quad \frac{\partial Hx}{\partial z} = \frac{\partial Hz}{\partial x} \quad \frac{\partial Hy}{\partial z} = \frac{\partial Hz}{\partial y}$$

which means that the tensor is symmetrical.

A second property of the magnetic field H is that its divergence is zero (property of retaining the magnetic field flux), so that the trace of the tensor is zero, i.e.:

$$\frac{\partial Hx}{\partial x} + \frac{\partial Hy}{\partial y} + \frac{\partial Hz}{\partial z} = 0$$

These two properties of the magnetic field H make it possible to determine the gradient of the magnetic field on the basis of five instead of nine measurements.

Figure 6:
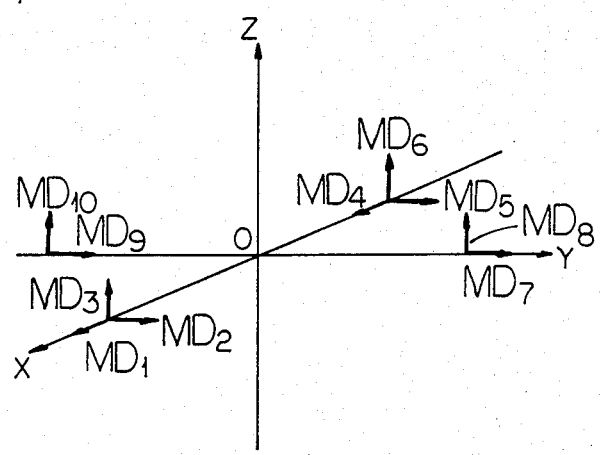
FIG. 6 another embodiment of the magnetic field gradient measuring means of the apparatus according to the invention.

A measuring means making it possible to determine this tensor is diagrammatically shown in FIG. 6. This measuring means comprises ten directional magnetometers MD1, MD2, ..., MD10, which are diagrammatically represented by an arrow in FIG. 6 for indicating the component which they measure. Thus, directional magnetometer MD1 measures the component Hx of the magnetic field and directional magnetometer MD8 measures component Hz of the magnetic field.

The directional magnetometers are grouped into five pairs. In each pair, the two magnetometers measure the same component of the magnetic field and are arranged symmetrically with respect to the centre 0 of the seeking apparatus. The difference of the values measured by the two magnetometers of the same pair constitutes an unbiased estimate of one of the parameters of the tensor.

If the components of the magnetic field respectively measured by directional magnetometers MD1, MD2, ..., MD10 are designated H1, H2, ... H10, the measured value of the components of the tensor in the vicinity of point 0 is equal to:

$$\begin{bmatrix} H_1 - H_4 & H_2 - H_5 & H_3 - H_6 \\ H_2 - H_5 & H_7 - H_9 & H_8 - H_{10} \\ H_3 - H_6 & H_8 - H_{10} & -(H_1 - H_4) - (H_7 - H_9) \end{bmatrix}$$

The criterion making it possible to determine the direction in which the seeking apparatus must be moved to reach the sought magnetic object is defined on the basis of at least three (p in the general case) components of the tensor.

This criterion can e.g. be the square of the modulus of the gradient of a magnetic field component, i.e. by taking e.g. the component Hx:

$$F = \left(\frac{\partial Hx}{\partial x}\right)^2 + \left(\frac{\partial Hx}{\partial y}\right)^2 + \left(\frac{\partial Hx}{\partial z}\right)^2$$

Figure 7:
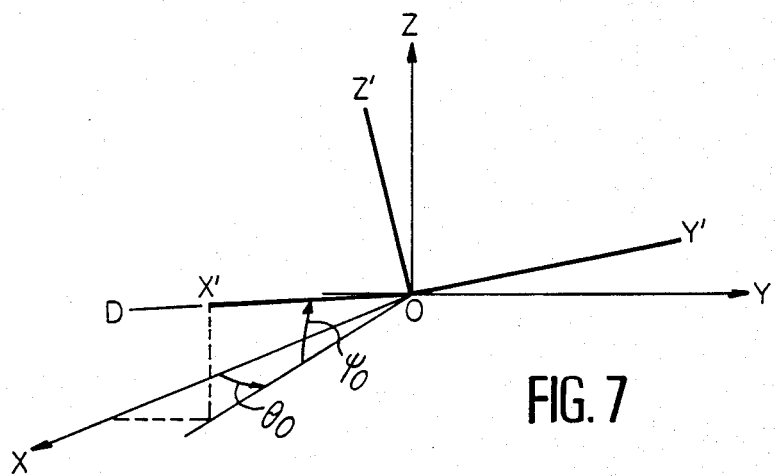
FIG. 7 a graph showing the determination of the direction D in which the criterion is at a maximum for an apparatus, whereof the measuring means corresponds to FIG. 6.

The optimization of the criterion F then consists of finding the direction D parallel to axis Ox' of a reference frame (Ox', Oy', Oz') obtained by the rotation of angles $\theta$ and $\psi$ of reference frame (Ox, Oy, Oz), as shown in FIG. 7 and which maximizes the expression:

$$F = \left(\frac{\partial Hx'}{\partial x'}\right)^2 + \left(\frac{\partial Hx'}{\partial y'}\right)^2 + \left(\frac{\partial Hx'}{\partial z'}\right)^2$$

A first criterion optimization method consists of expressing the terms of the preceding equation as a function of the terms of the tensor and angles $\theta$ and $\psi$, then directly calculating, by derivation of criterion F with respect to the angles $\theta$ and $\psi$ the values $\theta_o$ and $\psi_o$ maximizing said criterion.

A second method consists of directly seeking the value of the doublet $(\theta,\psi)$ which maximizes the criterion by proceeding in the following way. $(\theta_{n-1}, \psi_{n-1})$ is used for the detection of the moving vehicle displacement axis Ox at instant $T_{n-1}$ in the fixed reference frame (this means that at instant $T_{n-1}$ the criterion was at a maximum in said direction). It is known how to calculate the new value of the criterion for any rotation $(\theta,\psi)$ of the tensor measured in the direction $(\theta_{n-1}, \psi_{n-1})$ (properties of the tensors). Thus, in an interval $$I = \left[\left(-\frac{\Delta\theta}{2} + \frac{\Delta\theta}{2}\right), \left(-\frac{\Delta\psi}{2} + \frac{\Delta\psi}{2}\right)\right]$$

is sought the maximum of the criterion (either by systematic scanning of the space I, or by iterations with analysis of the derivative).

The trajectory is then corrected in such a way that the axis Ox has a direction $(\theta_0, \psi_0)$ corresponding to the maximum of the criterion on space I, said direction being designated $(\theta_n, \psi_n)$ in the fixed reference frame.

In certain cases (first Gauss position for e.g. a dipolar object), it may be impossible to maximize the criterion for a single value of the doublet $(\theta,\psi)$. There is said to be a degeneration of the information. In such a situation, it is not possible to calculate the optimum displacement direction of the apparatus and continuation takes place in the direction determined during the preceding measurement.

It is possible to evaluate the degree of degeneration of the information by analysing in the form of a histogram the validity of the maximum obtained (form of the function F $(\theta,\psi)$ about its maximum).

The use of a measuring means constituted by directional magnetometers permits the optimum overcoming of the geomagnetic field and thus facilitates the seeking of the magnetic object. However, such an apparatus does not make it possible to completely cancel out the disturbances due to the gradient of the geomagnetic field vector. In order to completely eliminate the influence of the geomagnetic field, as in the seeking apparatus according to the first embodiment, it is possible to have recourse to a periodic electromagnetic source fixed to the sought object and to a synchronous detection of said source by the apparatus according to the invention. This can only be used in special cases, where it is possible to provide the sought magnetic object with a periodic electromagnetic source.

What is claimed is:

1. Apparatus for determining a trajectory for finding a magnetic object, the apparatus comprising:
   measuring means for measuring at least three independent components of the gradient of a parameter at least dependent upon a magnetic field ambient at a point at least partly from a magnetic object;
   determining means for determining and storing a scalar criterion which is a function of the measuring components of the gradient;
   calculating means for calculating from the determined and stored criterion the direction $(\theta,\psi)$ maximizing the criterion; and
   display means for displaying the direction, whereby the direction is a trajectory for moving a vehicle toward the object,
   wherein the measuring means comprises four total field magnetometers, one of the magnetometers being placed in the centre of a trihedron linked with the apparatus and the three other magnetometers are each disposed on one of the axes of said trihedron, each magnetometer measuring the modulus of the magnetic field in which it is placed.

2. Apparatus for determining a trajectory for finding a magnetic object, the apparatus comprising:
   measuring means for measuring at least three independent components of the gradient of a parameter at least dependent upon a magnetic field ambient at a point at least partly from a magnetic object;
   determining means for determining and storing a scalar criterion which is a function of the measured components of the gradient;
   calculating means for calculating from the determined and stored criterion the direction $(\theta, \psi)$ maximizing the criterion; and
   display means for displaying the direction, whereby the direction is a trajectory for moving a vehicle toward the object,
   wherein the measuring means comprises six total field magnetometers, the magnetometers being grouped in pairs, the two magnetometers of one pair being placed on the same axis of a trihedron in symmetrical manner with respect to the centre of said trihedron, each magnetometer measuring the modulus of the magnetic field in which it is placed.

3. Apparatus for determining a trajectory for finding a magnetic object, the apparatus comprising:

measuring means for measuring at least three independent components of the gradient of a parameter at least dependent upon a magnetic field ambient at a point at least partly from a magnetic object;

determining means for determining and storing a scalar criterion which is a function of the measured components of the gradient;

calculating means for calculating from the determined and stored criterion the direction $(\theta,\psi)$ maximizing the criterion; and display means for displaying the direction, whereby the direction is a trajectory for moving a vehicle toward the object, wherein the measuring means comprises a plurality of directional magnetometer pairs, the directional magnetometers of the same pair being located on the same axis of a trihedron in symmetrical manner with respect to the centre of said trihedron, said plurality of magnetometer pairs being disposed in such a way as to measure the tensor of the gradient of the magnetic field vector in the vicinity of the centre of said trihedron.

* * * * *